(12) United States Patent
Sakamoto

(10) Patent No.: US 11,042,359 B2
(45) Date of Patent: Jun. 22, 2021

(54) SEMICONDUCTOR DEVICE INCLUDING AN ADDER

(71) Applicants: Kabushiki Kaisha Toshiba, Minato-ku (JP); Toshiba Electronic Devices & Storage Corporation, Minato-ku (JP)

(72) Inventor: Nobuaki Sakamoto, Kawasaki (JP)

(73) Assignees: Kabushiki Kaisha Toshiba, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 43 days.

(21) Appl. No.: 16/565,679

(22) Filed: Sep. 10, 2019

(65) Prior Publication Data

US 2020/0285445 A1   Sep. 10, 2020

(30) Foreign Application Priority Data

Mar. 8, 2019 (JP) .............................. JP2019-042161

(51) Int. Cl.
*G06F 7/53* (2006.01)
*G06F 7/533* (2006.01)

(52) U.S. Cl.
CPC .......... *G06F 7/5318* (2013.01); *G06F 7/5334* (2013.01)

(58) Field of Classification Search
CPC ....... G06F 7/523–7/5235; G06F 7/53–7/5318; G06F 7/5334–7/5336
See application file for complete search history.

(56) References Cited

U.S. PATENT DOCUMENTS

| | | | | |
|---|---|---|---|---|
| 4,864,529 A | * | 9/1989 | Shah ..................... | G06F 7/5334 708/630 |
| 5,504,915 A | * | 4/1996 | Rarick .................. | G06F 7/5318 708/708 |
| 6,272,513 B1 | | 8/2001 | Douzono et al. | |
| 7,296,049 B2 | * | 11/2007 | Hojsted ................. | G06F 7/5336 708/625 |

(Continued)

FOREIGN PATENT DOCUMENTS

| | | | | |
|---|---|---|---|---|
| EP | 1703636 A1 | * | 9/2006 | ......... H03H 17/0223 |
| JP | 04-330519 A | | 11/1992 | |
| JP | 2524035 Y2 | | 1/1997 | |

(Continued)

*Primary Examiner* — Matthew D Sandifer
(74) *Attorney, Agent, or Firm* — Oblon, McClelland, Maier & Neustadt, L.L.P.

(57) ABSTRACT

According to the embodiments, a semiconductor device includes: an adder configured to generate positive multiple data of the multiplicand which is used for a plurality of the multiplication in plurality and does not include a value of $2^n$ (n is a positive integer) of the multiplicand; a Wallace tree circuit provided in each of the multiplier circuits and configured to operate a sum of a plurality of partial products by using a plurality of adders; and a selection circuit provided in each of the multiplier circuits and configured to select, according to a plurality of bits selected from the multiplier, data falling in a multiple of one of the multiplicand, data of $2^n$ of the multiplicand, and the positive multiple data from the adder in order to output as one partial product of the plurality of partial products to the Wallace tree circuit.

6 Claims, 3 Drawing Sheets

(56) References Cited

U.S. PATENT DOCUMENTS

2004/0139131 A1* 7/2004 Guevokian ............. G06F 17/16
708/233
2006/0020654 A1* 1/2006 Hubert .................. G06F 7/5334
708/492

FOREIGN PATENT DOCUMENTS

JP            3417286 B2    6/2003
JP          2012-043405 A   3/2012

* cited by examiner

FIG. 3

$$\begin{cases} P_i = 0 \text{ WHEN } y_{i+1}y_i = 00 \\ P_i = X \text{ WHEN } y_{i+1}y_i = 01 \\ P_i = 2X \text{ WHEN } y_{i+1}y_i = 10 \\ P_i = 3X \text{ WHEN } y_{i+1}y_i = 11 \\ (i = 0, 2) \end{cases}$$

FIG. 4

$$\begin{cases} \begin{array}{ccccccccc} & & & & x_3 & x_2 & x_1 & x_0 & \rightarrow \text{MULTIPLICAND } X \\ \times & & & & y_3 & y_2 & y_1 & y_0 & \rightarrow \text{MULTIPLIER } Y \\ \hline & & & p_{40} & p_{30} & p_{20} & p_{10} & p_{00} & \rightarrow \text{PARTIAL PRODUCT P0} \\ & p_{42} & p_{32} & p_{22} & p_{12} & p_{02} & & & \rightarrow \text{PARTIAL PRODUCT P2} \\ \hline z_7 & z_6 & z_5 & z_4 & z_3 & z_2 & z_1 & z_0 & \rightarrow \text{PRODUCT } Z \end{array} \end{cases}$$

US 11,042,359 B2

SEMICONDUCTOR DEVICE INCLUDING AN ADDER

CROSS-REFERENCE TO RELATED APPLICATIONS

This application is based upon and claims the benefit of priority from the prior Japanese Patent Application No. 2019-42161 filed in Japan on Mar. 8, 2019; the entire contents of which are incorporated herein by reference.

FIELD

Embodiments described herein relate generally to a semiconductor device.

BACKGROUND

Semiconductor devices including multiplier circuits have been widely used. Multiplier circuits generate a plurality of partial products by multiplying or in other words AND processing respective bits of multiplicands and multipliers and then apply addition processing to the plurality of generated partial products, whereby a multiplication result is obtained. For the addition processing, a partial product adder circuit is used in which a plurality of half adders or full adders (hereinafter, the adders are collectively referred to as an adder) are arranged in, for example, a tree structure called a Wallace tree.

BRIEF DESCRIPTION OF THE DRAWINGS

FIG. 3 is a diagram explaining partial products obtained when multipliers are processed by two bits at once according to the first embodiment;

FIG. 4 is a diagram explaining sums of partial products obtained when multipliers are processed by two bits at once according to the first embodiment;

DETAILED DESCRIPTION

Semiconductor devices according to embodiments include at least one multiplier circuit each configured to perform multiplication by multiplying a binary multiplicand by a binary multiplier, having: a first adder configured to generate positive multiple data of the multiplicand which is used for the multiplication in plurality and does not include a value of $2^n$ (n is a positive integer) of the multiplicand; a partial product adder circuit provided in each of the multiplier circuits and configured to operate a sum of a plurality of partial products by a plurality of second adders; and a selection circuit provided in each of the multiplier circuits and configured to select, according to a plurality of bits selected from the multiplier, data falling in a multiple of one of the multiplicand, data of $2^n$ of the multiplicand, and the positive multiple data of the first adder to output to the partial product adder circuit as one partial product of the plurality of partial products.

In the following, each embodiment is explained with reference the drawings.

First Embodiment

Figure 1:
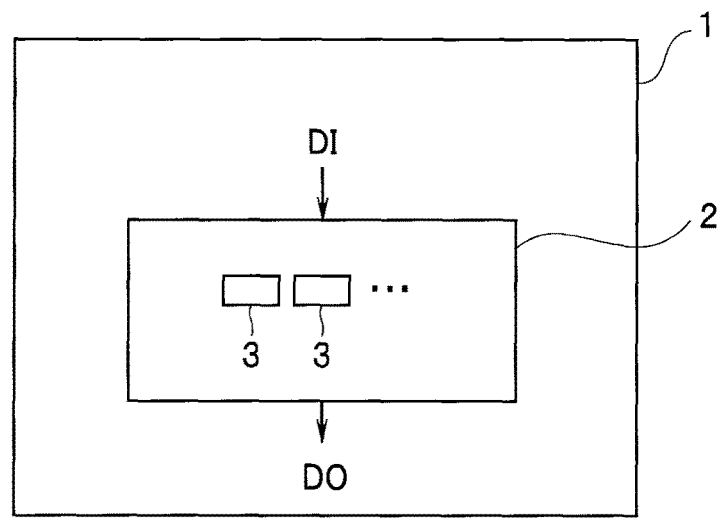
FIG. 1 is a configuration diagram of a semiconductor device according to a first embodiment.
Figure 2:
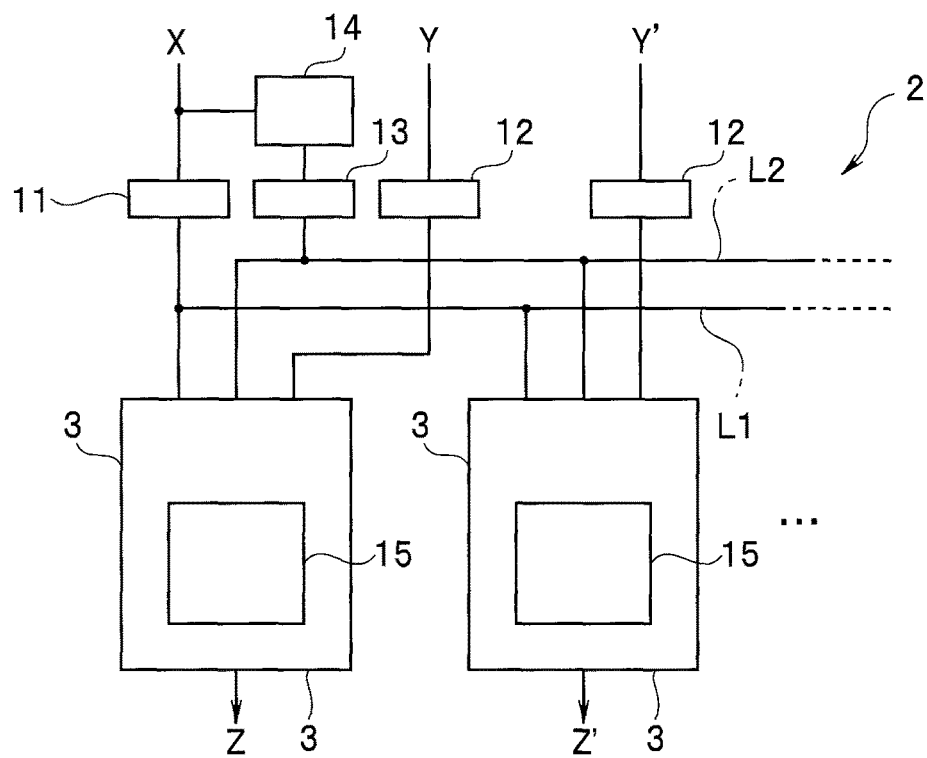
FIG. 2 is a circuit block diagram showing a configuration of a product sum operation circuit according to the first embodiment.

FIG. 1 is a configuration diagram of a semiconductor device according to the present embodiment. FIG. 2 is circuit block diagram showing a configuration of a product sum operation circuit. A semiconductor device 1 has a product sum operation circuit 2. The product sum operation circuit 2 includes a plurality of multiplier circuits 3 for use in product sum operation. The product sum operation circuit 2 is a circuit for use in processing various digital signals in image processing or the like.

The product sum operation circuit 2 performs product sum operation for input data DI and outputs a result of the product sum operation as output data DO. The input data DI is composed of a plurality of data and the output data also is composed of a plurality of data. The product sum operation circuit 2 is used for various processings including, for example, filtering processing applied to image data and machine learning (e.g. deep learning) for artificial intelligence (AI) processing. Therefore, the product sum operation circuit 2 includes a multiple number of the multiplier circuits 3.

As shown in FIG. 2, each of the multiplier circuits 3 of the product sum operation circuit 2 receives a multiplicand and a multiplier, and each of the multiplier circuits 3 outputs a product as a product as a multiplication result. The multiplicand, the multiplier and the product are binary data. It is shown in FIG. 2 that one multiplier circuit 3 receives a multiplicand X and a multiplier Y and outputs a product Z, and a different one multiplier circuit 3 receives the multiplicand X and a multiplier Y' and outputs a product Z'.

The product sum operation circuit 2 includes registers 11, 12, 13, an adder 14, and a plurality of the multiplier circuits 3. Hence, the semiconductor device 1 includes the plurality of the multiplier circuits 3 each of which is configured to perform multiplication by multiplying a multiplicand by a multiplier. The register 11 receives data of the multiplicand X. The register 11 stores binary data of the multiplicand X to output to each of the multiplier circuits 3.

A plurality of the registers 12 receive data of the multiplier circuits Y, Y', . . . supplied to the corresponding multiplier circuits 3. Each of the registers 12 stores binary data of the multiplier circuits Y, Y', . . . to output to the corresponding multiplier circuit 3.

The register 13 receives data from the adder 14. The register 13 stores binary data sent from the adder 14 to output to each of the multiplier circuits 3.

The adder 14 is a circuit configured to receive data of the multiplicand X and generate multiple data falling in multiples of three, five or six of the multiplicand X. The multiple data generated by the adder 14 is not data of "$2^n$" of the multiplicand X. The adder 14 outputs multiple data as an addition result to the register 13. For example, when the adder 14 performs operation of data falling in multiples of three of the multiplicand X, the adder 14 includes a circuit configured to add X which is a value in multiple of one of the multiplicand X, and 2X which is a value in multiples of two of the multiplicand X. In other words, the adder 14 is a circuit configured to generate positive multiple data (3X, 5X, 6X . . . ), which is in multiples of three, five or six of the multiplicand X and does not have a value of $2^n$ (n is a positive integer) of the multiplicand X, for use in a plurality of multiplications.

The adder 14 is a circuit configured to operate a value which is not a value of $2^n$ (herein, n is a positive integer) of the multiplicand such as a value in multiples of two, four and eight of the multiplicand but is a "non-$2^n$" value such as a value in multiples of three, five and six of the multiplicand in order to process generating one partial product for a plurality of bits of the multiplicand X.

The registers 11, 12, 13 are flip-flops configured to hold binary data. The register 11 stores the multiplicand X. The registers 12 store the multiplier Y. The register 13 stores output data of the adder 14 or in other words positive multiple data of the multiplicand X. Each of the multiplier circuits 3 receives data from the registers 11, 12, 13. Each of the multiplier circuits 3 includes a Wallace tree circuit 15 as a partial product adder circuit. Although the Wallace tree circuits 15 are used as a partial product adder circuit in the present embodiment, other circuits may also be used. The Wallace tree circuits 15 are a circuit provided in each of the multiplier circuits 3 and configured to operate a sum of a plurality of partial products by a plurality of adders arranged in a tree shape.

As stated above, each of the multiplier circuits 3 receives data of the multiplicand X, data of the multiplier Y, and multiple data of the multiplicand X which does not include a value of $2^n$ of the multiplicand X. Herein, because the adder 14 supplies multiple data of the multiplicand X which does not include a value of $2^n$ of the multiplicand X to the Wallace tree circuits 15, each of the Wallace tree circuits 15 is simply required to have a shift circuit configured to generate data of $2^n$ obtained by multiplying the multiplicand X by two or four.

In other words, because each of the multiplier circuits 3 including the Wallace tree circuit 15 does not have an adder configured to generate a "non-$2^n$" value of the multiplicand X, each of the multiplier circuits 3 needs to have only a circuit configured to perform operation of $2^n$ or in other words a shift circuit. Therefore, the number of adders to which a glitch in the Wallace tree circuits 15 is propagated is reduced, whereby resulting in reduction of power consumption.

Next, a circuit configuration of the multiplier circuits 3 in the semiconductor device 1 according to the present embodiment is explained based on an example of a case using 4-bit data as a multiplicand and a multiplier of.

First of all, to make the explanation simple, it is explained how the multiplier Y is processed by two bits at once when the multiplicand X is composed of four bits (x3, x2, x1, x0) and the multiplier Y is composed of four bits (y3, y2, y1, y0).

FIG. 3 is directed to explain a partial product when the multiplier Y is processed by two bits at once. In FIG. 3, i is 0 or 2. Pi is a partial product. When two bits of the multiplier Y is "00," partial product of the multiplier Y becomes "0." When two bits of the multiplier Y are "01," partial product of the multiplier Y becomes "X" of the multiplicand X. When two bits of the multiplier Y are "10," partial product of the multiplier Y becomes "2X" which is twice as many as the multiplicand X. When two bits of the multiplier Y are "11," partial product of the multiplier Y becomes "3X" which is three times as many as the multiplicand X.

FIG. 4 is provided to explain a sum of partial products obtained when the multiplier Y is processed by two bits at once. As shown in FIG. 4, a sum Z of the multiplicand X and the multiplier Y is equal to a sum of partial products P0 and P2. The partial product P0 is expressed by (P40, P30, P20, P10, P00), the partial product P2 is expressed by (P42, P32, P22, P12, P02), and the product Z is expressed by (Z7, Z6, Z5, Z4, Z3, Z2, Z1, Z0).

Figure 5:
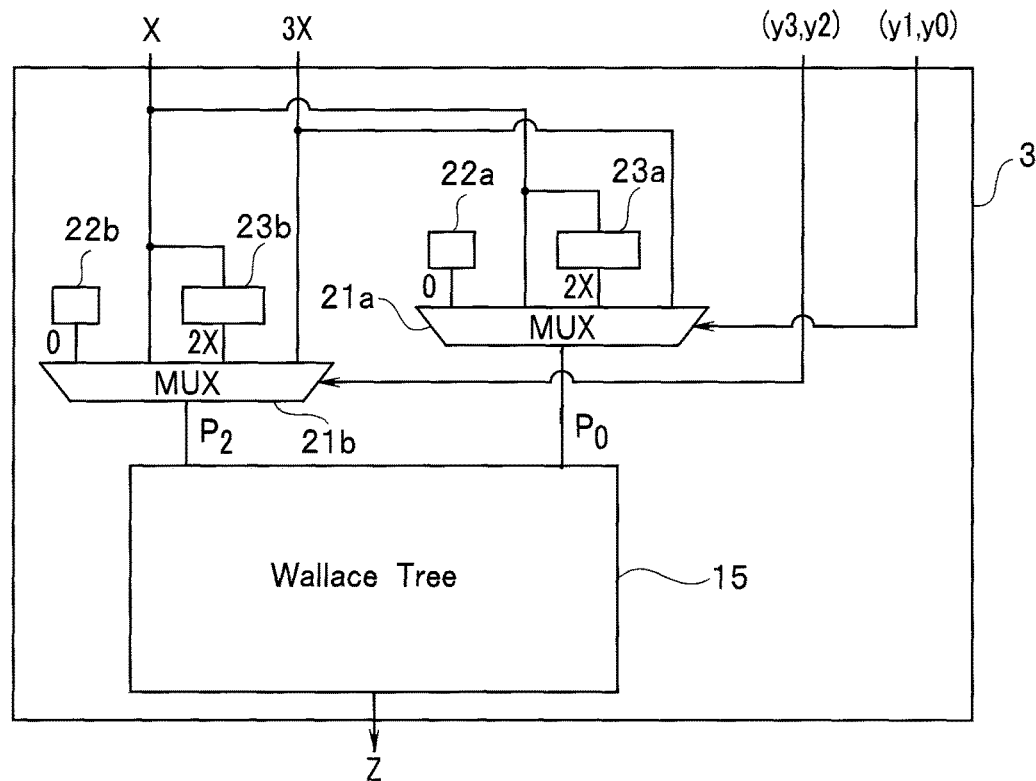
FIG. 5 is a circuit diagram showing a configuration of each multiplier circuit according to the first embodiment.

FIG. 5 is a circuit diagram showing a configuration of each of the multiplier circuits 3. FIG. 5 shows a multiplier circuit configured to generate a partial product by processing two bits at once to the multiplier Y as explained in FIG. 3 and FIG. 4.

The multiplier circuit 3 includes multiplexers 21a, 21b, reference power supplies 22a, 22b, and shift circuits 23a, 23b. Each of the shift circuits 23a, 23b shifts input data leftward by one bit. In other words, each of the shift circuits 23a, 23b generates and outputs a value in multiples of two of the multiplicand X, or in other words "2X."

The reference power supplies 22a, 22b output data indicating that a partial product has a value of "0." Each of the shift circuits 23a, 23b is a circuit configured to shift input data leftward by one bit and therefore outputs data indicating that a partial product is "2X." A partial product "3X" sent from the aforementioned adder 14 is stored in the register 13 and each of the shift circuits 23a, 23b outputs data indicating that the partial product sent from the register 13 is "3X."

Each of the multiplexers 21a, 21b is provided to a plurality of bits selected from the multiplier Y. The multiplexer 21a receives four pieces of data including data indicative of "0" sent from the reference power supply 22a, data of the multiplicand X sent from the register 11, data of "2X" sent from the shift circuit 23a, and data of "3X" sent from the register 13. In other words, each of the multiplexers 21a, 21b obtains data of "3X" from the register 13. The multiplexer 21a outputs data selected among the four pieces of data corresponding to low-order two bits (y1, y0) of the multiplier Y and according to the conditions shown in FIG. 3 as a partial product P0.

In the same manner, the multiplexer 21b receives four pieces of data including data indicative of "0" sent from the reference power supply 22b, data of the multiplicand X sent from the register 11, data of "2X" sent from the shift circuit 23b, and data of "3X" sent from the register 13. The multiplexer 21b outputs data selected among the four pieces of data corresponding to the high-order two bits (y3, y2) of the multiplier Y and according to the conditions shown in FIG. 3 as a partial product P2. In other words, the multiplexers 21a, 21b are provided in each of the multiplier circuits 3 and constitute a plurality of selection circuits 21a, 21b configured to select any one of data falling in a multiple of one of the multiplicand X, data of $2^n$ (2X herein) of the multiplicand X, and positive multiple data (3X herein) of the adder 14 according to a plurality of bits (two bits herein) selected from the multiplier Y to output as one partial product of a plurality of partial products to the Wallace tree circuit 15.

As stated above, a value of "2" of the multiplicand X can be generated by the shift circuit configured to shift data of the multiplicand X, but multiple data which has a "non-$2^n$" value of the multiplicand X and is in multiples of three, five, six, or the like of the multiplicand X cannot be generated by the shift circuit and is therefore generated by the aforementioned adder 14 installed outside the Wallace tree circuit 15. Thus, as opposed to the case where adders need to be provided corresponding to the number of bits processed at once in processing the multiplier Y by several bits at once, only one adder needs to be provided in the product sum operation circuit 2.

In other words, because the aforementioned product sum operation circuit 2 has the adder 14 which is commonly used, an adder configured to generate data falling in multiples of three of the multiplicand X does not need to be provided in each of the Wallace tree circuits 15. Hence, a circuit scale of the Wallace tree circuit 15 shown in FIG. 5 is substantially half the size of a circuit scale of a Wallace tree circuit including an adder configured to generate data falling in multiples of three of the multiplicand X. As a result, power consumed by a glitch generated in a plurality of adders in the multiplier circuit 3 is reduced significantly.

Although the aforementioned embodiment was explained based on an example of the case where the multiplier Y is processed by two bits at once, it is also applicable to cases where the multiplier Y is processed by more than three bits at once such as three bits at once, four bits at once or five bits at once. In the cases, the adder 14 includes a circuit configured to generate multiple data "5X" which is in multiples of five of the multiplicand X, "6X" which is in multiples of six of the multiplicand X, or "7X" which is in multiples of seven of the multiplicand X.

Accordingly, the multiplier circuit 3 shown in FIG. 5 enables multiplication using two partial products P0, P2 shown in FIG. 4.

Herein, effects of the semiconductor device 1 according to the present embodiment are explained. In the adder, when two input signals are changed according to the same clock cycle, output signals will have a glitch due to a fine differential delay of the two input signals and excessive power is consumed. A signal outputted from the adder turns into a signal received by other adders. Therefore, a glitch is propagated in the form of a signal received by, for example, an adder disposed in a rear stage within the Wallace tree. As a result, excessive power is also consumed by the adder in the rear stage.

There is also ingenuity exercised to reduce the number of adders by reducing the number of partial products for reduction of power consumed by multiplier circuits. One example of such ingenuity is a method of processing to generate one partial product for a plurality of bits of a multiplier rather than generating one partial product for one bit of a multiplier.

For example, when a multiplier is processed by two bits at once, no addition is made in the case of "00," a multiplicand is added in the case of "01," data falling in multiples of two of a multiplicand is added in the case of "10," and data falling in multiples of three of a multiplicand is added in the case of "11," thus achieving reduction in the number of partial products as a result.

However, even if a method of processing a multiplier by, for example, two bits at once is adopted, it will result in requiring an adder to have a multiplier circuit to generate data falling in multiples of three of a multiplicand. Therefore, there will also be a glitch in the adder, whereby the benefit of reducing the number of partial products is cancelled. When a multiplier is processed by three or more bits at once, an adder will be necessary to generate data falling in multiples of five, six or seven of a multiplicand.

It is also possible to use Booth's algorithm to avoid the process of generating data falling in multiples of three of a multiplicand. By using Booth's algorithm, a partial product can be generated only by, for example, data obtained by multiplying a multiplicand by one or two and negative number of the data.

However, Booth's algorithm may provide a negative partial product even in uncoded multiplication, in which code expansion may occur. In the case, the number of adders is increased to cope with code expansion and therefore more power is consumed by increased adders.

The multiplier circuit 3 in the semiconductor device 1 according to the present embodiment is provided with components provided outside the Wallace tree circuit 15, which are the adder 14 configured to generate positive multiple data of a multiplicand as a non-$2^n$ value, and the register 13 configured to store output data of the adder 14. Output data of the adder 14 is stored temporarily in the register 13 and therefore a glitch generated in the adder 14 is not propagated to the Wallace tree circuit 15 provided in the rear stage. As a result, power consumed in the Wallace tree circuit 15 is suppressed.

As stated above, according to the above embodiment, a semiconductor device in which power consumed by a glitch generated in adders is suppressed can be provided.

In addition, there is also an effect of realizing reduced chip size of the semiconductor device including a plurality of multiplier circuits.

Note that, in the present embodiment, to perform a plurality of product sum operations in a state where a value of the multiplicand X remains unchanged, it may be controlled to suspend a clock applied to the register 13 which holds an output of the adder 14 for further reduction of power consumption. For example, when x1 is used as the multiplicand X at a certain cycle t1 and the same x1 is further used as the multiplicand X at a cycle t2 subsequent to the cycle t1, a clock applied to the register 13 may be suspended at the cycle t2. Additionally, when the same x1 is used as the multiplicand X at a cycle t3 subsequent to the cycle t2, a clock applied to the register 13 may also be suspended at the cycle t3. Accordingly, when the multiplicand x1 is used continuously, the multiplicand x1 is once stored in the register 13 and then supply of a clock signal to the register 13 is suspended, whereby achieving reduction of power consumption. In other words, while performing a plurality of multiplications in a state where a multiplicand value remains unchanged, a clock signal supplied to the register 13 may be suspended.

Second Embodiment

The product sum operation circuit 2 of the semiconductor device 1 according to the first embodiment has a plurality of the multiplier circuits 3, whereas a product sum operation circuit 2 according to a second embodiment has one multiplier circuit 3. The multiplier circuit 3 operates several times at different timings to generate and output a plurality of products of multipliers and multiplicands given at different timings.

The semiconductor device 1 according to the second embodiment has substantially the same configuration as the semiconductor device 1 according to the first embodiment shown in FIG. 1 and the multiplier circuit 3 also has the same configuration as the multiplier circuit 3 shown in FIG. 5. Thus, same reference numbers are used for the same components and explanation of the same components is omitted.

Figure 6:
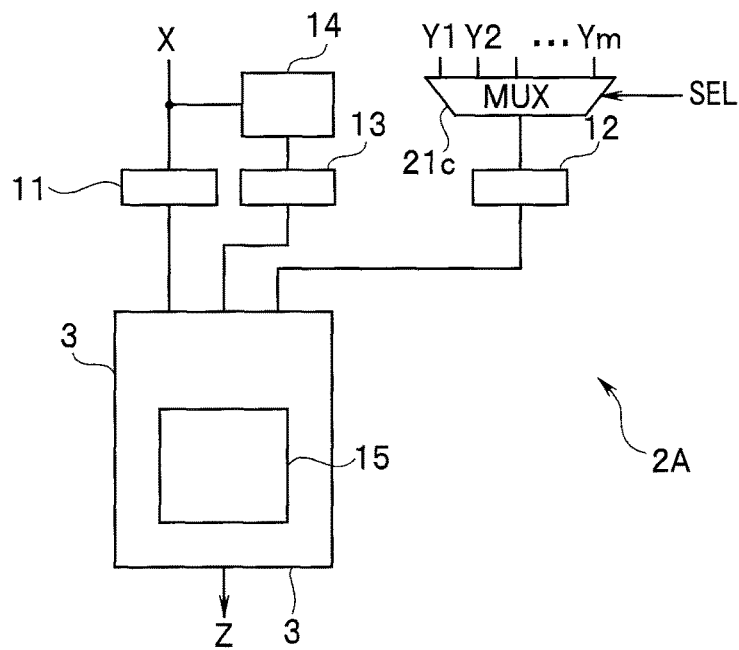
FIG. 6 is a circuit diagram showing a configuration of a multiplier circuit of a semiconductor device according to a second embodiment.

FIG. 6 is a circuit diagram showing a configuration of a product sum operation circuit 2A in the semiconductor device 1 according to the present embodiment. A plurality of mutually different multipliers Y1, Y2, . . . Ym (m pieces herein (m is a positive integer)) are given at different timings to the product sum operation circuit 2A shown in FIG. 6.

The product sum operation circuit 2A includes one multiplier circuit 3, the registers 11, 12, 13, the adder 14, and a multiplexer 21c.

The multiplexer 21c receives a selection signal SEL. The selection signal SEL is given at different timings by a control circuit not shown to the multiplexer 21c.

Thus, the multiplexer 21c receives the plurality of multipliers Y1, Y2, . . . by which the multiplicand X is multiplied and the multiplexer 21c selects any one of the plurality of multipliers Y1, Y2, . . . according to the selection signal SEL to output to the register 12.

The multiplier circuit 3 outputs one production Z according to any one of timings of the selection signal SEL. Then, the multiplier circuit 3 outputs a plurality of products according to the plurality of multipliers selected at different timings based on the selection signal SEL.

Hence, according to the present second embodiment, it is also possible to provide a semiconductor device in which power consumed by a glitch generated in adders is suppressed.

Note that control may be made in the present second embodiment to suspend, during calculation of a plurality of products, a clock applied to the register 13 which holds an output of the adder 14 in order to realize further reduction of power consumption. In other words, a clock signal supplied to the register 13 may be suspended during calculation of a plurality of products by the multiplier circuit 3.

As stated above, according to each of the aforementioned embodiments, it is possible to provide a semiconductor device in which power consumed by a glitch generated in adders is suppressed.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A semiconductor device comprising:
    a plurality of multiplier circuits each configured to perform multiplication by multiplying a binary multiplicand by a binary multiplier;
    a first adder configured to generate positive multiple data of the multiplicand which is used for the multiplication and does not include a value of $2^n$ (n is a positive integer) of the multiplicand;
    a register configured to store the positive multiple data;
    a partial product adder circuit provided in each of the multiplier circuits and configured to operate a sum of a plurality of partial products by using a plurality of second adders; and
    a selection circuit provided in each of the multiplier circuits and configured to select, according to a plurality of bits selected from the multiplier, data of a multiple of one of the multiplicand, data of $2^n$ of the multiplicand, and the positive multiple data in order to output as one partial product of the plurality of partial products to the partial product adder circuit, wherein
    a clock signal applied to the register is suspended while a plurality of the multiplications are performed in a state where a value of the multiplicand remains unchanged.

2. The semiconductor device according to claim 1, wherein each of the plurality of multiplier circuits includes a circuit configured to generate a value of $2^n$ of the multiplicand.

3. The semiconductor device according to claim 2, wherein the circuit configured to generate a value of $2^n$ of the multiplicand is a shift circuit.

4. The semiconductor device according to claim 1, wherein the partial product adder circuit is a Wallace tree circuit including the plurality of second adders arranged in a tree shape.

5. A semiconductor device, comprising:
    a multiplier circuit configured to perform multiplication by niultiplyjim a binary multiplicand by a binary multiplier:
    a first adder configured to generate positive multiple data of the multiplicand which is used for the multiplication and does not include a value of $2^n$ (n is a positive integer) of the multiplicand:
    a register configured to store the positive multiple data, and
    a partial product adder circuit provided in the multiplier circuit and configured to operate a sum of a plurality of partial products by using a plurality of second adders, wherein
    the multiplier circuit outputs a plurality of products according to the multiplier selected at different timings based on a selection signal, and
    a clock signal applied to the register is suspended while the one multiplier circuit calculates the plurality of products.

6. The semiconductor device according to claim 5, wherein the partial product adder circuit is a Wallace tree circuit including the plurality of second adders arranged in a tree shape.

* * * * *